(12) United States Patent
Ooi et al.

(10) Patent No.: US 12,389,206 B2
(45) Date of Patent: Aug. 12, 2025

(54) PRIVATE DIGITAL ASSISTANT TALKGROUP INTEGRATION

(71) Applicant: MOTOROLA SOLUTIONS, INC., Chicago, IL (US)

(72) Inventors: Chun Wen Ooi, Penang (MY); Jia Wei Yeap, Penang (MY); Mohamad Fathur Hafeezat Mohd Zahari, Selangor (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 426 days.

(21) Appl. No.: 18/147,931

(22) Filed: Dec. 29, 2022

(65) Prior Publication Data
US 2024/0224001 A1    Jul. 4, 2024

(51) Int. Cl.
| | | |
|---|---|---|
| H04W 4/08 | (2009.01) | |
| G10L 15/08 | (2006.01) | |
| G10L 15/22 | (2006.01) | |
| G10L 15/30 | (2013.01) | |
| H04W 76/50 | (2018.01) | |

(52) U.S. Cl.
CPC ............... *H04W 4/08* (2013.01); *G10L 15/08* (2013.01); *G10L 15/22* (2013.01); *G10L 15/30* (2013.01); *G10L 2015/088* (2013.01)

(58) Field of Classification Search
CPC ......... H04W 4/80; H04W 4/90; H04W 76/50; H04W 4/10; H04W 76/45; H04W 72/121; G10L 15/08; G10L 15/22; G10L 15/30; G10L 2015/088; H04L 65/4061; H04L 51/02; G06Q 50/265
See application file for complete search history.

(56) References Cited

U.S. PATENT DOCUMENTS

| | | | |
|---|---|---|---|
| 9,172,747 B2 | 10/2015 | Walters et al. | |
| 10,135,965 B2* | 11/2018 | Woolsey | H04W 4/12 |
| 10,809,876 B2 | 10/2020 | Brown et al. | |
| 11,395,108 B2 | 7/2022 | Kee et al. | |
| 11,676,176 B2* | 6/2023 | Baldwin | G06Q 30/0269 705/14.1 |
| 2009/0282367 A1* | 11/2009 | Canis | G06Q 10/107 715/835 |
| 2011/0119196 A1 | 5/2011 | Ventura et al. | |
| 2015/0326302 A1* | 11/2015 | Stojanovski | H04W 12/033 370/315 |
| 2019/0037370 A1* | 1/2019 | Beller | H04W 4/023 |
| 2019/0050238 A1* | 2/2019 | Lim | G06V 10/82 |

(Continued)

*Primary Examiner* — Andrew Wendell
(74) *Attorney, Agent, or Firm* — Michael Best & Friedrich LLP

(57) ABSTRACT

Systems and methods for integrating an enterprise digital assistant into a public safety talkgroup. One example system includes a talkgroup server communicatively coupled to a dispatch console and a public safety digital assistant server. The talkgroup server includes an electronic processor configured to receive connection information, associated with an incident, for an enterprise digital assistant server, establish a connection with the enterprise digital assistant server based on the connection information, and generate a talkgroup for the incident, the talkgroup members including the public safety digital assistant server, the dispatch console, and the enterprise digital assistant server.

18 Claims, 7 Drawing Sheets

(56) References Cited

U.S. PATENT DOCUMENTS

| | | | |
|---|---|---|---|
| 2019/0149959 A1* | 5/2019 | Kee ........................ | G10L 13/02 |
| | | | 704/258 |
| 2021/0084433 A1 | 3/2021 | Niemiec et al. | |
| 2021/0124630 A1* | 4/2021 | Chew ...................... | G06F 9/547 |
| 2021/0200598 A1 | 7/2021 | Barczyk et al. | |
| 2021/0287670 A1* | 9/2021 | Regan .................... | G10L 15/22 |
| 2025/0111851 A1* | 4/2025 | Grubb ..................... | G06F 3/167 |

* cited by examiner

PRIVATE DIGITAL ASSISTANT TALKGROUP INTEGRATION

BACKGROUND OF THE INVENTION

Tablets, laptops, phones, two-way radios, and other electronic communications devices utilized by first responders (including fire fighters, police officers, and paramedics, among others) provide such users and others with instant access to increasingly valuable additional information and resources. Many such communications devices may further include, or provide access to, electronic digital assistants (DAs), sometimes referred to as "virtual partners," that may provide the user thereof with valuable information automatically (e.g., without further user input) or semi-automatically (e.g., with some further user input). Such information provided to the user may be based on explicit requests (queries) for such information posed by the user via an input (e.g., such as a parsed natural language input or an electronic touch interface manipulation associated with a request) in which the electronic DA may, in response, provide such requested valuable information.

Electronic DAs are software applications running on underlying electronic hardware that are capable of understanding natural language and may complete electronic tasks in response to user voice inputs, among other additional or alternative types of inputs. These electronic DAs may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1:
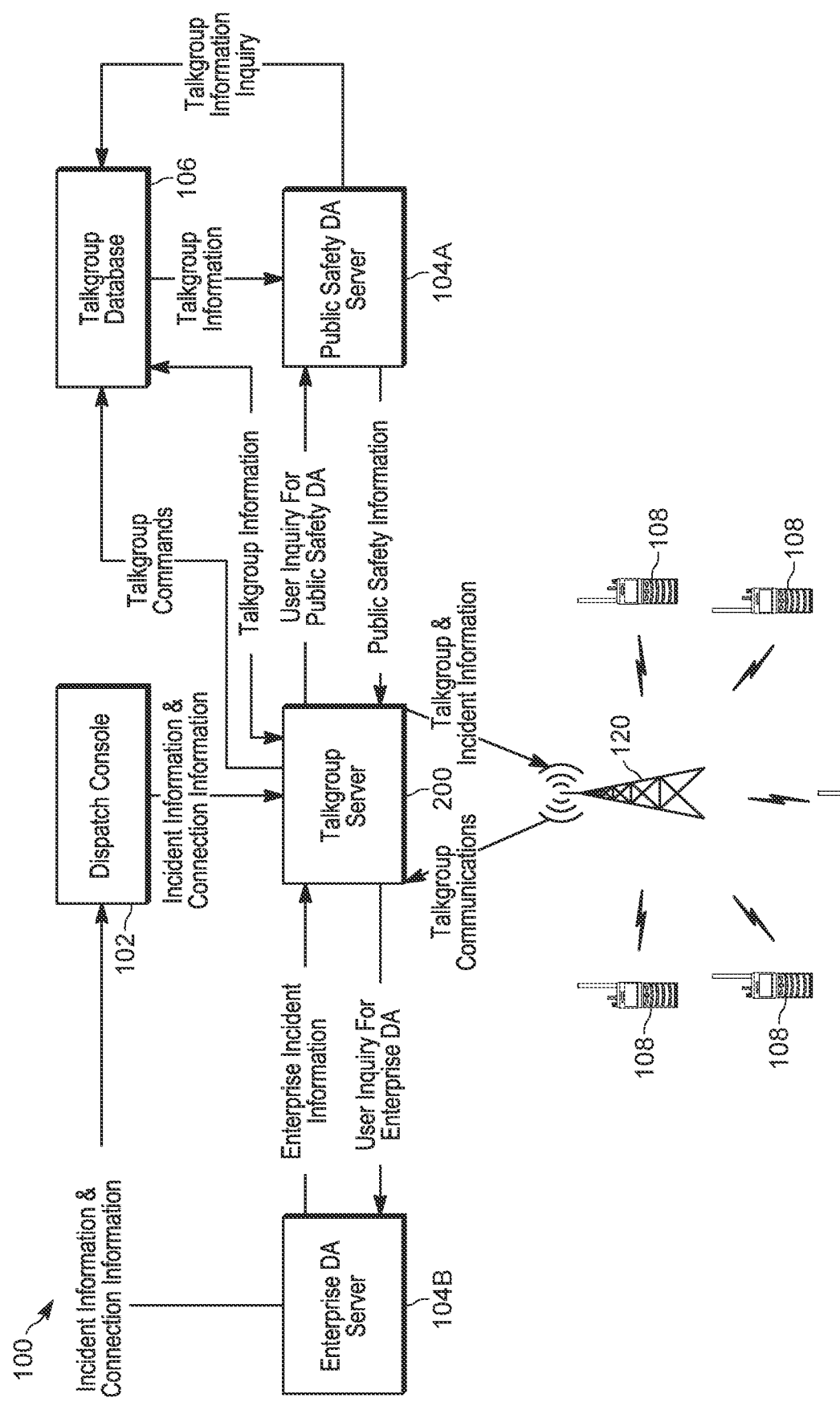
FIG. 1 is a diagram of a communications system in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

In public safety communication systems, communications devices are often affiliated to different communication groups (also referred to as talkgroups) to perform group communication. Group communication functionality allows a communications device (also referred to as a talkgroup member) to simultaneously communicate with one or more other devices that are associated with the same talkgroup. Such group communications allow for communications devices to communicate the same message to other devices without the need to establish different communication sessions or repeat transmission of the message to each respective communications device.

In such communications devices (e.g., land mobile radios), a push-to-talk (PTT) interface may be utilized to allow a user of the communications device to actuate a PTT interface to transmit audio on one or more communication channels (which may include a talkgroup channel or a private channel) for reception by multiple communications devices (each associated with a respective user) associated with the talkgroup or for reception by a single communications device of the talkgroup, respectively.

During public safety operations, a talkgroup may be associated with a particular public safety incident (e.g., a robbery, a fire, a wellness check, a medical emergency, a traffic incident, and the like). The users of the talkgroup may utilize a public safety digital assistant (DA), also referred to as virtual partners, to acquire information and/or access resources, for example, associated with the public safety incident. The user, in particular, may provide an inquiry to the public safety DA regarding one or more details about the public safety incident (e.g., any related arrest records, vehicle history, vehicle plate and registration information, historic and outstanding warrants, health information, vehicle registration information, address information, traffic information, and the like) and any other information that may aid the user in making a more informed determination of an action to take or how to resolve a situation, among other possibilities. The public safety DA, in turn, may retrieve the requested information from one or more servers/databases that the public safety DA has access to.

There may be instances where the information requested by the user is not directly accessible by the public safety DA.

Such instances may include, for example, when the requested information is enterprise specific information. Enterprise specific information is any data associated with a respective organization (outside of the public safety system) that is collected and stored within a private enterprise database. Such data may include sensor information (e.g., closed-circuit television (CCTV) footage, camera images, occupancy data, employee records, operation hours, security system information, additional sensor information, and the like).

While the public safety DA may request access to such enterprise databases directly or request the information through a management server of the enterprise, even with access to the enterprise database, the public safety DA may not be able to efficiently search for the required information due to enterprise-specific lexicon and syntax that the public safety digital assistant may not recognize. For example, enterprises have their own proprietary/customized DAs that may efficiently navigate through their respective enterprise systems to provide seamless and accurate services to customers or employees of the enterprise. The particular lexicon and syntax recognizable by the enterprise DA may not be the same as (or translate over from) the lexicon and syntax by which the public safety DA operates. It may be beneficial for public safety users to be able to directly interact with enterprise digital assistants and may allow quick access to enterprise-specific information while they are supporting an incident (e.g., at the enterprise itself).

Accordingly, systems and methods are provided herein for, among other things, creating and managing public safety talkgroups to include enterprise DA servers. Among other things, embodiments and aspects provided herein, rather than having the public safety DA search the enterprise database system directly or request the enterprise DA server to search according to the user inquiry, add the enterprise DA server itself to a public safety talkgroup to receive and handle the user inquiry directly within the talkgroup. This allows talkgroup users to inquire directly to the enterprise DA server, rather than through the public safety DA server of the talkgroup. Using such embodiments, users of the talkgroup are able to request and receive enterprise information more quickly and accurately, avoiding additional steps and potential incorrect inquiry requests performed at the public safety DA server.

One example provides a system, which includes a talkgroup server communicatively coupled to a dispatch console and a public safety digital assistant server. The talkgroup server includes an electronic processor configured to receive connection information, associated with an incident, for an enterprise digital assistant server, establish a connection with the enterprise digital assistant server based on the connection information, and generate a talkgroup for the incident, the talkgroup members including the public safety digital assistant server, the dispatch console, and the enterprise digital assistant server.

Another example embodiment provides a method for operating a communications system including digital assistant communications. The method includes receiving connection information, associated with an incident, for an enterprise digital assistant server, establishing a connection with the enterprise digital assistant server based on the connection information, and generating a talkgroup for the incident, the talkgroup including a public safety digital assistant server, a dispatch console, and the enterprise digital assistant server.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should be understood that although certain figures presented herein illustrate hardware and software located within particular devices, these depictions are for illustrative purposes only. In some instances, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

As used in the present application, the term "talkgroup" refers to a virtual radio channel that is used for communication among a group of subscriber units/electronic communications devices. As noted, an organization may have several talkgroups and each talkgroup may be associated with a particular mission (incident) of the organization. An incident refers to a task or activity assigned to one or more members of an organization or a sub-division thereof. For example, a talkgroup may include a group of police officers patrolling a predefined neighborhood. Similarly, a talkgroup may include members who have the same role or designation (e.g., police officer, detective, paramedic, and the like) within an incident. For example, paramedics and firefighters responding to a distress call may be grouped into two different talkgroups part of the same mission. Each electronic communications device in a particular talkgroup is assigned a talkgroup identifier, which allows the electronic communications device to communicate with other electronic communications devices assigned the same talkgroup identifier. Although the examples and embodiments below are described in terms of a single talkgroup, it should be understood that electronic communications devices (and thus the users of the electronic communications devices) may be assigned to multiple talkgroups at the same time.

Figure 2:
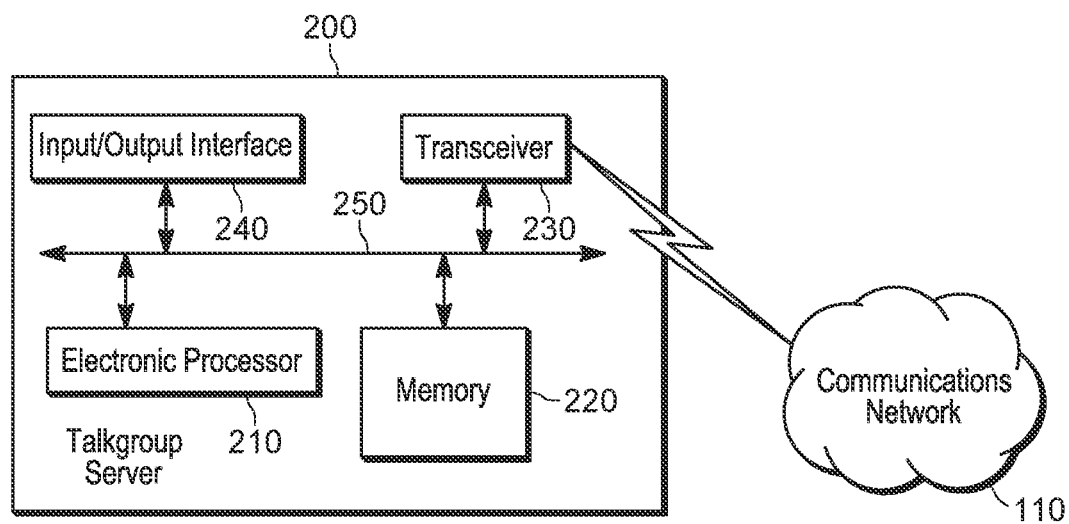
FIG. 2 is a block diagram of a talkgroup server of the communications system of FIG. 1 in accordance with some examples.

FIG. 1 is a diagram of one example of a communications system 100. In the example illustrated, the system 100 includes a talkgroup server 200 communicatively coupled to a dispatch console 102 and a public safety digital assistant (DA) server 104A. The system also includes a talkgroup database 106 communicatively coupled to the talkgroup server 200 and, in some aspects, the public safety DA server 104A. The talkgroup server 200 is further configured to be communicatively coupled to one or more of a plurality of electronic communication devices 108 (i.e., subscriber units). The talkgroup server 200, described more particularly below with respect to FIG. 2, is configured to establish and perform communications to and from an enterprise DA server 104B.

As illustrated in FIG. 1, the database 106 may be a database housed on a suitable database server communicatively coupled to and accessible by the talkgroup server 200. In alternative embodiments, the database 106 may be part of a cloud-based database system (e.g., a data warehouse) external to the system 100 and accessible by the talkgroup server 200 over one or more wired or wireless networks. In some instances, all or part of the database 106 may be locally stored on the talkgroup server 200. The database 106 electronically stores talkgroup information (e.g., data designating talkgroup assignments for the electronic communications devices 108, associated users of the electronic communications devices 108 within the respective talkgroups, and the like) and talkgroup device data (e.g., model, configuration, and user characteristic information for the electronic communications devices 108), and, in some instances, contextual condition data (e.g., telemetry and other data relating to the electronic communications devices 108 and respective users of the electronic communications devices 108 transmitted by the electronic communications devices 108 to the talkgroup server 200).

The electronic communications devices 108 are communicatively coupled via a communications network 110. The communications network 110 may include a land mobile radio (LMR) network, a terrestrial trunked radio (TETRA) network, or a digital mobile radio (DMR) network. The communications network 110 may also include a wide area network (WAN) (e.g., a transport control protocol/internet protocol (TCP/IP) based network), a cellular network, (e.g., a long-term evolution (LTE) network), a device-to-device network, and combinations or derivatives thereof. In the illustrated examples, each of the electronic communications devices 108 communicate with the talkgroup server 200 through a base station 112.

In some instances, talkgroups are created and administered by the talkgroup server 200. The talkgroup server 200 may, for example, create a talkgroup related to a particular incident based on communications from the dispatch console 102. The dispatch console 102 is a dispatch controller for a public safety organization. The talkgroup server 200 communicates with the plurality of electronic communications devices 108 via the communications network 110.

In some instances, the talkgroup server 200 may be a central network equipment or a dispatch controller used by a public safety agency such as a fire department or police department. In other instances, the talkgroup server 200 may be any network equipment used by an agency, network administrator, or telecommunications provider.

The dispatch console 102 may be directly coupled to the talkgroup server 200, as shown, or may be indirectly coupled to talkgroup server 200 via one or more internal or external networks (not shown). The dispatch console 102 allows an administrator or dispatcher at a dispatch console to initiate infrastructure-sourced group communications to groups of the electronic communications devices 108, among other features and functions. In accordance with some aspects, the dispatch console 102 may also be added to one or more talkgroups as a member of the talkgroups, for example, to transmit and/or listen to communications of the talkgroups. In some instances, some or all of the functionality of the dispatch console 102 may be incorporated into the talkgroup server 200 and vice versa. In some instances, the talkgroup server 200 and the dispatch console are incorporated into a single device.

The public safety DA server 104A and the enterprise DA servers 104B are part of a separate public safety database network (not shown) and an enterprise database network, respectively. Each of the DA servers 104A, 104B are configured to implement a respective digital assistant program. The digital assistant programs may be a software application running on underlying electronic hardware (e.g., one or more of an electronic processor) that is capable of understanding natural language (i.e., processing unstructured inputs/data) and may complete electronic digital-assistant tasks in response to user voice inputs, detection of a contextual situation (e.g., detection of an incident based on processing the incident data), instructions received from other devices, among other additional or alternative type of inputs. Each of the digital assistant programs, implemented on either or both of the public safety DA sever 104A and the enterprise DA server 104B, may include one or more of a natural language processing (NLP) engine configured to determine the intent and/or content of an unstructured input, for example, an oral inquiry received from a user of the electronic communications device 108. Based on the intent and/or content of the inquiry, the respective server 104A, 104B may perform one or more of digital assistant tasks which may include, among other things, requesting information from one or more databases (not shown) of a respective network of the respective DA servers 104A, 104B.

The public safety DA server 104A is communicatively coupled to one or more databases and/or servers associated with a public safety system network (not shown). The public safety DA server 104A, through the public safety system network, is configured to access public safety information (e.g., arrest records, historic and outstanding warrants, health information, vehicle registration information, address information, and the like) to execute one or more digital-assistant tasks that are assigned based on its capabilities and/or particular user inquiry. The public safety DA server 104A may also be able to access publicly available information (e.g., historic or present weather information, address information, contact information, etc.) through one or more additional network systems (not shown). The public safety DA server 104A may also be configured to access talkgroup information (e.g., talkgroup membership information, information regarding other talkgroups present on the public safety system network, and the like) by making talkgroup information inquiries to the talkgroup database 106 (or the talkgroup server 200).

The enterprise DA server 104B is communicatively coupled to one or more databases and/or servers associated with an enterprise network (not shown). The enterprise DA server, through the enterprise network, is configured to access information related to the enterprise (e.g., closed-circuit television (CCTV) footage, camera images, occupancy data, employee records, operation hours, security system information, additional sensor information, inventory for the enterprise, location(s) of that inventory, whether the inventory is hazardous, and the like) to execute one or more digital-assistant tasks that are assigned based on its capabilities and/or the particular user inquiry. The enterprise DA server 104B may further be configured to access information related to one or more other enterprises associated with the enterprise. The enterprise DA server, in some instances, is configured to access publicly available information through one or more additional network systems.

It should be understood that, while DA functionality described herein as being performed by the DA servers 104A and 104B, it should be understood that at least some DA functionality is implemented at the talkgroup server 200 and/or one or more of the electronic communications devices 108. For example, the electronic communications device 108 and/or the talkgroup server 200 may be configured to perform natural language processing (NLP) on an audible user inquiry received by the electronic communications device 108.

In some instances, either or both of the DA servers 104A and 104B perform machine learning functions, for example, to improve performance in comprehension of user inquiries and what information is required to fulfill the inquiry. Machine learning generally refers to the ability of a computer program to learn without being explicitly programmed. In some instances, a computer program (e.g., a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering. Bayesian networks, reinforcement learning, representation learning, similarity and metric learning, sparse dictionary learning, and genetic algorithms. Using all of these approaches, a computer program can ingest, parse, and understand data, and progressively refine algorithms for data analytics.

On a singular basis, one of the electronic communications devices 108 may be referred to herein as an electronic communications device 108. Each of the electronic communications device 108 is a portable communications device, and may be, for example, a mobile two-way radio, a smart telephone, a smart watch, a laptop computer, a tablet computer, or other similar device capable of operating as described herein. As described in detail herein, the talkgroup server 200 sends talkgroup commands (e.g., adding or removing devices 108 from one or more talkgroups) to the electronic communications devices 108. The electronic communications devices 108 transmit talkgroup communications, as described in detail herein, to the talkgroup server 200.

It should be noted that FIG. 1 illustrates only one example of the system 100. In other instances, the system 100 may include more or fewer components and may perform functions that are not explicitly described herein. In addition, although the talkgroup server 200 is illustrated as communicating with the electronic communications device 108 via a single communications network 110, the talkgroup server 200 may communicate with the electronic communications devices 108 via multiple communication networks (constructed in accordance with various network protocols) and connections (e.g., wired or wireless connections). Further, although the system 100 is shown as a centralized system, the system 100 may also be implemented as a decentralized system in which the functionality of the talkgroup server 200 is accomplished within one or more of the electronic communications devices 108, or in other network infrastructure (not shown).

FIG. 2 schematically illustrates one example of the talkgroup server 200. In the example illustrated, the talkgroup server 200 includes an electronic processor 210, a memory 220, a transceiver 230, and an input/output interface 240. The electronic processor 210, the memory 220, the transceiver 230, and the input/output interface 240 communicate over one or more control and/or data buses (e.g., a communication bus 250). FIG. 2 illustrates only one example of a talkgroup server 200. The talkgroup server 200 may include more or fewer components and may perform functions other than those explicitly described herein.

In some instances, the electronic processor 210 is implemented as a microprocessor with separate memory, such as the memory 220. In other instances, the electronic processor 210 may be implemented as a microcontroller (with memory 220 on the same chip). In other instances, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the talkgroup server 200 described herein. The memory 220 may include, for example, a program storage area and a data storage area. The program storage area and the data storage area may include combinations of different types of memory, such as read-only memory and random-access memory.

The transceiver 230 enables wireless communication from the talkgroup server 200 to, for example, the electronic communications devices 108 (via the communications network 110), the dispatch console 102, the public safety DA server 104A, the enterprise DA server 104B, and the database 106. In other instances, rather than the transceiver 230, the talkgroup server 200 may include separate transmitting and receiving components, for example, a transmitter, and a receiver. In yet other instances, the talkgroup server 200 may not include a transceiver 230 and may communicate with the components of the system 100 via a network interface and a wired connection to the communications network 110.

As noted above, the talkgroup server 200 may include the input/output interface 240. The input/output interface 240 may include one or more input mechanisms (e.g., a touch screen, a keypad, a button, a knob, and the like), one or more output mechanisms (e.g., a display, a printer, a speaker, and the like), or a combination thereof. The input/output interface 240 receives input from input devices actuated by a user (e.g., a dispatcher), and provides output to output devices with which the user interacts. In some instances, as an alternative or in addition to managing inputs and outputs through the input/output interface 240, the talkgroup server 200 may receive user input, provide user output, or both by communicating with an external device, such as a console computer, over a wired or wireless connection.

The public safety DA server 104A and the enterprise DA server 104B are each suitable server devices including hardware components similar to the talkgroup server 200 described above (e.g., one or more of an electronic processor, memory, and transceiver). In some instances, either or both DA servers 104A, 104B may be part of a cloud-based server network.

Figure 3:
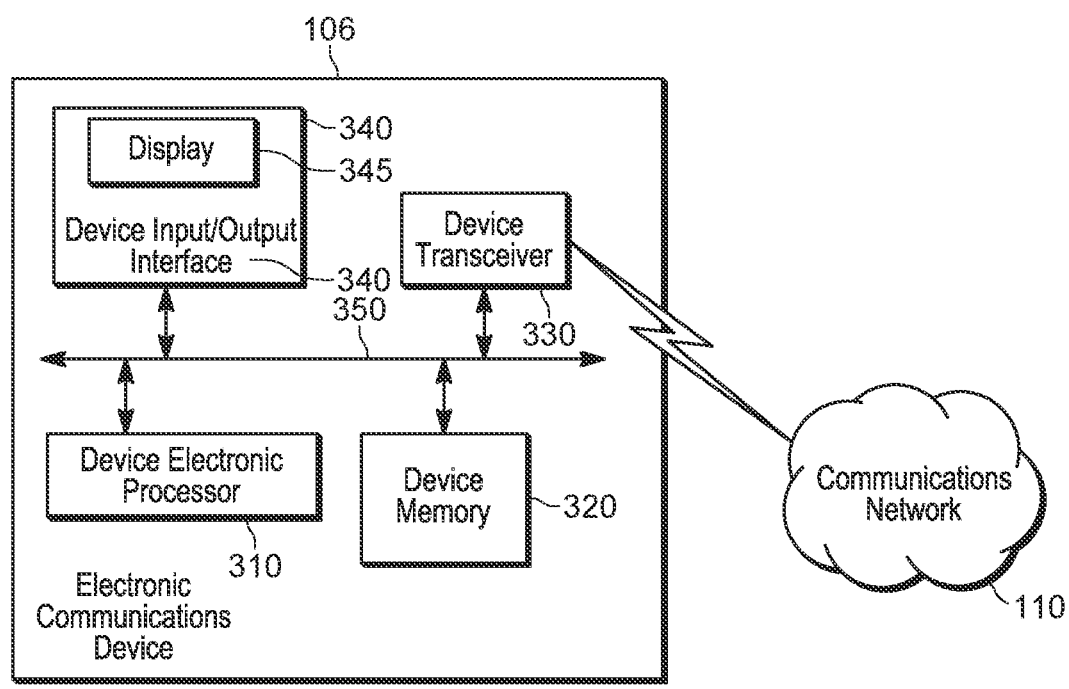
FIG. 3 is a block diagram of an electronic communications device of the communications system of FIG. 1 in accordance with some examples.

FIG. 3 schematically illustrates an electronic communications device 108 according to some examples. In the particular example illustrated, the electronic communications device 108 includes, among other things, a device electronic processor 310, a device memory 320, a device transceiver 330, and a device input/output interface 340. The device electronic processor 310, the device memory 320, the device transceiver 330, and the device input/output interface 340 communicate over one or more control and/or data buses (e.g., a device communication bus 350). FIG. 3 illustrates only one example of the electronic communications device 108. The electronic communications device 108 may include more or fewer components than illustrated and may perform additional functions other than those described herein.

The device electronic processor 310 may be implemented in various ways including ways that are similar to those described above with respect to the electronic processor 210. Likewise, the device memory 320 may be implemented in various ways including ways that are similar to those described with the respect to the memory 220. The device memory 320 may store instructions that are received and executed by the device electronic processor 310 to carry out the functionality described herein.

The device transceiver 330 enables wireless communication from the electronic communications device 108 to, for example, the talkgroup server 200 via the communications network 110. In other instances, rather than a device transceiver 330, the electronic communications device 108 may include separate transmitting and receiving components, for example, a transmitter and a receiver.

The device input/output interface 340 may include one or more input mechanisms (e.g., a microphone, a touch screen, a keypad, a button, a knob, a push-to-talk (PTT) selection mechanism, and the like), one or more output mechanisms (e.g., a display, a speaker, and the like), or a combination thereof.

In the illustrated example, the device input/output interface 340 includes a display 345. The display 345 is a suitable display such as, for example, a liquid crystal display (LCD) touch screen, or an organic light-emitting diode (OLED) touch screen. In some instances, the electronic communications device 108 implements a graphical user interface (GUI) (e.g., generated by the electronic processor 310, from instructions and data stored in the memory 320, and presented on the display 345), that enables a user to interact with the device 108. In some instances, the electronic communications device 108 enables display remotely, for example, using a display (configured similarly to the display 345) from the electronic communications device 108.

In some instances, the electronic communications device 108 communicates with one or more external devices that may be part of a personal area network (PAN) of devices. The one or more external devices may include, for example, a holster sensor, an environmental sensor, a biometric sensor, a body-mountable camera, and the like.

The electronic communications device 108 comprise, or provide access to, electronic DAs (e.g., through the public safety DA server 104A and, via the method 400 of FIG. 4 described in more detail below, the enterprise DA server 104B) that may provide the user thereof with valuable information in an automated (e.g., without further user input) or semi-automated (e.g., with some further user input) fashion. The information provided to the user may be based on explicit requests for such information posed by the user via an input (e.g., such as a parsed natural language input or an electronic touch interface manipulation associated with an explicit request) in which the electronic digital assistant may reactively provide such requested valuable information.

As some existing examples, electronic digital assistants such as Siri™ provided by Apple, Inc. and Google Assistant™ provided by Google LLC, are software applications running on underlying electronic hardware that are capable of understanding natural language and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

As noted, talkgroup servers (e.g., the talkgroup server 200) may establish and manage talkgroups. The talkgroup server 200 further provides user inquiries for the public safety DA server 104A. As noted above, when information related to a particular enterprise (not directly accessible to the public safety DA server 104A) is requested by a user, the information provided to the user, in response, may be delayed due to extra steps in authorizing the public safety DA server 104A to access a particular enterprise database or having the public safety DA server 104A request the information through an enterprise management server (e.g., the enterprise DA server 104B). Such instances not only introduce delay, but also present potential misinterpretation of the particular user inquiry due to syntax/stored dictionary differences between the public safety DA server 104A and the enterprise DA server 104B. This can result in inefficient use and delay in the delivery or accurate information to users of the communications network.

Figure 4:
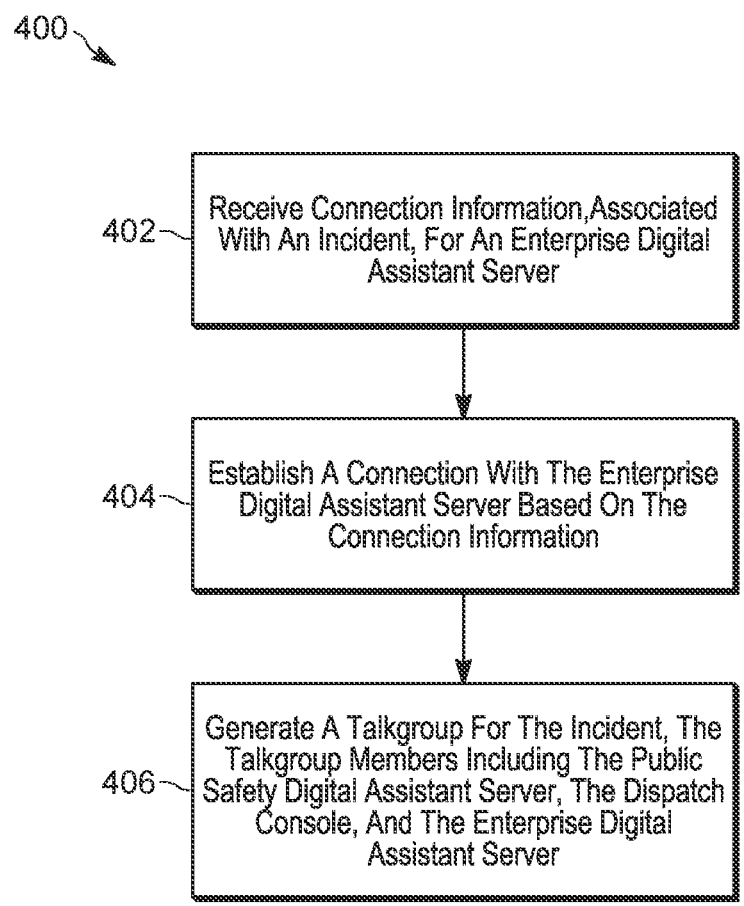
FIG. 4 is a flowchart illustrating a method for operating the communications system of FIG. 1 to establish communications with an enterprise DA server in accordance with some examples.

FIG. 4 illustrates an example method 400 for operating a communications system to establish communications with an enterprise DA server. Although the method 400 is described in conjunction with the system 100 as described herein, the method 400 could be used with other systems and devices. In addition, the method 400 may be modified or performed differently than the specific example provided. For example, in some instances the talkgroup created, as described below, may not include a public safety DA server.

As an example, the method 400 is described as being performed by the talkgroup server 200 and, in particular, the electronic processor 210. However, it should be understood that in some instances, portions of the method 400 may be performed by other devices, including for example, one or more of the DA servers 104A and 104B, the dispatch console 102, and/or the electronic communications device 108. Additional electronic processors may also be included in the DA servers 104A, 104B, the dispatch console 102, and/or the electronic communications device 108 that perform all or a portion of the method 400. For ease of description, the method 400 is described in terms of a single enterprise DA server (e.g., the enterprise DA server 104B). However, the method 400 may be applied to multiple enterprise DA servers.

At block 402, the electronic processor 210 receives connection information, associated with an incident, for an enterprise digital assistant server (e.g., the enterprise DA server 104B). The connection information is received, in particular, from the dispatch console 102 which receives the information from the enterprise DA server 104B. In some instances, the dispatch console 102 receives the information automatically from the enterprise DA server 104B (e.g., as part of a connection request). For example, the enterprise DA server 104B may include or utilize a security network detection software for automatic detection or recognition of an incident related to the enterprise. In response to a detection/recognition of an incident, the enterprise DA server 104B may automatically provide information, for establishing a connection to the enterprise DA server 104B directly, to the dispatch console 102. In some instances, the dispatch console 102 receives the information from the enterprise DA server 104B via a request to the server 104B. For example, the dispatch console 102 may transmit a request for connection information and/or information related to an incident associated with an enterprise of the enterprise DA server 104B. In response, the enterprise DA server 104B may provide information, for establishing a connection to the enterprise DA server 104B, to the dispatch console 102. In both instances, the enterprise DA server 104B may provide information regarding a particular instance (either as determined by the enterprise DA server 104B or as requested by the dispatch console 102.

At block 404, the electronic processor 210, based on the connection information, establishes a communication channel/connection with the enterprise DA server 104B. The connection information from the enterprise DA server 104B may include one or more of a unique identifier, a wake word, address information, and password information for the enterprise DA server 104B. The connection information may include, for example, enterprise DA server 104B identification information such as enterprise DA server 104B information (e.g., a hostname, an IP address, a port number, an access password, and the like). A wake word is a term (commonly a name) included in a user inquiry used to activate a DA function (e.g., to retrieve and display information according to a user inquiry).

As mentioned above, in addition to the connection information, the dispatch console 102 may also receive incident information from the enterprise DA server 104B in addition to the connection information. The incident information may include, for example, CCTV/video and/or camera footage, sensor information (e.g., smoke detectors information, humidity information, temperature information, etc.), occupancy data, employee information, vendor information, and the like.

At block 406, the electronic processor 210 generates a talkgroup for the incident. The talkgroup includes at least the public safety DA server 104A, the dispatch console 102, and the enterprise DA server 104B. The electronic processor 210 may further add one or more additional devices (for example one or more of the electronic communications devices 108).

Figure 5:
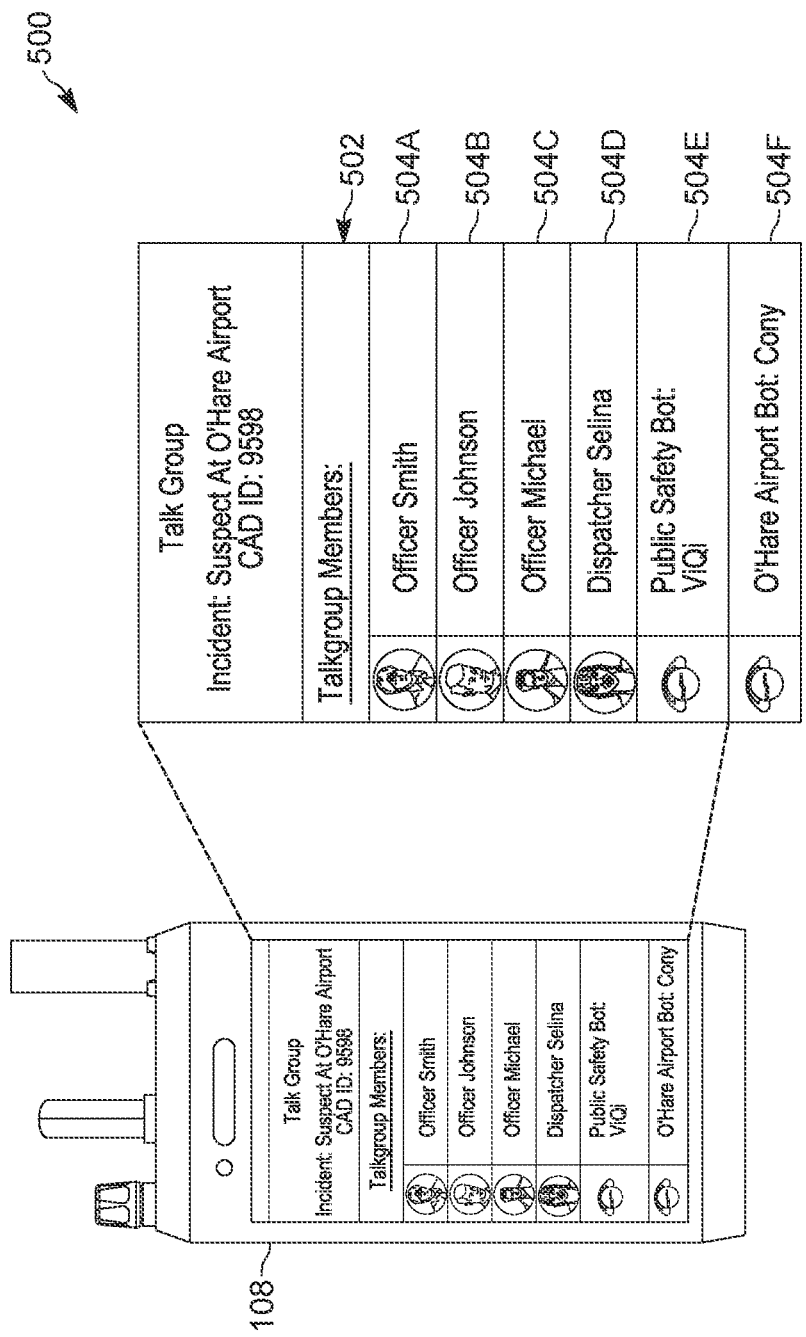
FIG. 5 illustrates an example user interface generated by the electronic communications device of FIG. 3 in accordance with some examples.

FIG. 5 is an example display 500 generated by the electronic communications device 108 (in particular, the display 345). The display 500 displays the members of the talkgroup generated, for example, at block 406 of the method 400 of FIG. 4. As shown in FIG. 5, the display 500 includes a list of a talkgroup 502 including a plurality of talkgroup members 504A-504F. Members 504A-504C are users each associated with a respective electronic communications device 108. Member 504D is a dispatcher (e.g., participating from the dispatch console 102). Members 504E and 504F are digital assistants for the public safety DA server 104A and the enterprise DA server 104B, respectively. As further described in regard to FIG. 6, following adding the enterprise DA sever 104B to the talkgroup at block 406 of the method 400, a user of a communications device 108 of the talkgroup generated at block 406 (including, in some instances, the dispatch console 102) is able to transmit a user inquiry directly to the enterprise DA server 104B through the talkgroup server 200.

Figure 6:
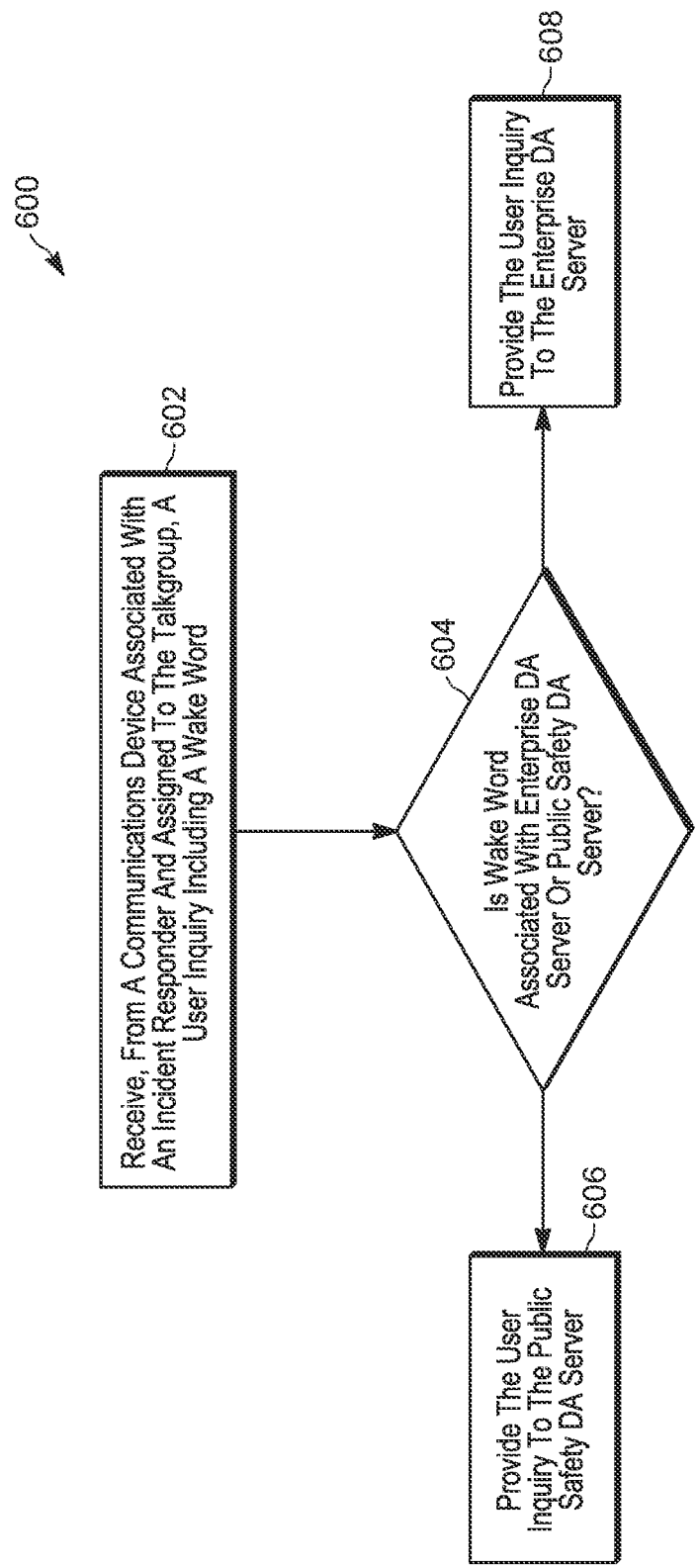
FIG. 6 is a method for operating the communications system of FIG. 1 to handle a user inquiry in accordance with some examples.

FIG. 6 illustrates an example method 600 for a communications system for handling a user inquiry. The method 600 is performed following establishing a communication channel between the talkgroup server 200 and the enterprise DA server 104B as described above in regard to the method 400 of FIG. 4. Although the method 600 is described in conjunction with the system 100 as described herein, the method 600 could be used with other systems and devices. In addition, the method 600 may be modified or performed differently than the specific example provided. For example, in some instances the talkgroup described below may not include a public safety DA server and, thus, may not determine whether a user inquiry includes a public safety DA wake word.

As an example, the method 600 is described as being performed by the talkgroup server 200 and, in particular, the electronic processor 210. However, it should be understood that in some aspects, portions of the method 600 may be performed by other devices, including for example, one or more of the DA servers 104A and 104B, the dispatch console 102, and/or the electronic communications device 108. Additional electronic processors may also be included in the DA servers 104A, 104B, the dispatch console 102, and/or the electronic communications device 108 that perform all or a portion of the method 600. For ease of description, the method 600 is described in terms of a single "user inquiry," which may be from any one of the electronic communications devices 108, and to a single enterprise server (e.g., the enterprise DA server 104B) and a single public safety DA server (e.g., the public safety DA server 104A). However, the method 600 may be applied to multiple portable communications devices and/or multiple public safety and/or enterprise DA servers.

At block 602, the electronic processor 210 receives, from a communications device associated with an incident responder and assigned to the talkgroup, a user inquiry including a wake word. The communications device may be, for example, one of the electronic communications device 108 or, in some instances, the dispatch console 102. In some instances, the user inquiry may include incident information (e.g., a photo, a video, an audio file, sensor data, a document file, etc.) related to the user inquiry (e.g., to narrow a search criteria). In some instances, the user inquiry may include more than one requested function for the DA of the particular server 104A, 104B to perform.

At block 604, the electronic processor 210 determines whether the wake word included in the user inquiry is associated with the public safety DA server 104A or the enterprise DA server 104B. If the wake word is associated with the public safety DA server 104A, the processor 210 provides the user inquiry to the public safety DA server 104A (block 606). If the wake word is associated with the enterprise DA server 104B, the processor 210 provides the user inquiry to the (block 608). In response to the user inquiry, the respective DA server (the public safety DA server 104A and the enterprise DA server 104B) is configured to provide, to one or more of the electronic communications devices 108 of the talkgroup (and/or the dispatch console 102), the requested information in response to the user inquiry. The respective electronic communications device(s), in turn, provide the requested information through an audio (e.g., via a speaker) or a video output (e.g., via a display such as the display 345) of the communications device associated with the incident responder.

In some instances, the wake word associated with the enterprise DA server 104B is an enterprise assigned wake word, a talkgroup server assigned wake word, and/or a common enterprise DA wake word. An enterprise assigned wake word is a predetermined term assigned by and/or utilized by the enterprise of the enterprise DA server. The talkgroup server assigned wake word is a term that is assigned to the enterprise DA server 104B by the talkgroup server 200. The talkgroup server 200, in some instances, is configured to compare an enterprise assigned wake word of the enterprise digital assistant server to a public safety wake word assigned to the public safety DA server 104A, and assign a talkgroup server assigned wake word (to be internally used within the talkgroup generated at block 406 of the method 400 of FIG. 4) to the enterprise DA server 104B. The talkgroup server 200 may assign a different wake word in response to determining that a level of similarity between the enterprise assigned wake word and the public safety wake word exceeds a predetermined similarity threshold. In other words, the talkgroup server 200 may be configured to assign a new wake word to the enterprise DA server 104B, for example, when the talkgroup server 200 determines that the enterprise wake word is too similar (phonetically or textually) to the public safety wake word associated with the public safety DA server 104A and/or, in some instances, a name of a user of one of the electronic communications devices 108 of the talkgroup. This may be done, for example, to avoid misinterpretation of which DA server the user inquiry is directed to and/or if a user inquiry is directed to a DA server at all.

In some instances, the talkgroup server 200 is configured to recognize user inquiries that include a common enterprise DA wake word. The common enterprise DA wake word is a wake word applicable to all enterprise digital assistants (e.g., "Enterprise DA," "Enterprise Bot," and the like). The talkgroup server 200, in turn, may assign the common enterprise DA wake word to the enterprise DA server 104B to be internally used within the talkgroup generated at block 406 of the method 400 of FIG. 4.

The talkgroup server 200 may further be configured to notify the enterprise DA server 104B of the new enterprise wake word (the talkgroup server assigned wake word and/or the common enterprise wake word) such that the enterprise DA server 104B will perform DA functions according to a received user inquiry that includes the new enterprise wake word. The talkgroup server 200 also may be configured to change the new enterprise wake word included within a user inquiry to the enterprise assigned wake word prior to transmitting the user inquiry to the enterprise DA server 104B.

For example, the enterprise assigned wake word for the enterprise DA server 104B may be "Rodney" while the public safety wake word for the public safety DA server 104A may be "Connie." The talkgroup server 200, upon determining that the wake words are too similar, may assign the wake word "Kurt" to the enterprise DA server 104B. Thus, while the enterprise DA server 104B is still referred to within the enterprise network as "Connie," a user of the electronic communications device 108 may use the wake word "Kurt" to refer a user inquiry to the enterprise DA server 104B.

In some instances, as mentioned above, the talkgroup server 200 may modify information included in the user inquiry (e.g., the wake word or additional information) provided to the enterprise DA server 104B. Such information may be modified based on one or more public safety data privacy policies. This may be done, for example, to prevent confidential public safety information from being transmitted. Likewise, the enterprise DA server 104B may modify information provided to the server 200 according to one or more enterprise data privacy policies to prevent confidential enterprise information from being transmitted. In some instances, the talkgroup server 200 is configured to block, from being transmitted to the enterprise DA server 104B, all communications within the talkgroup that do not contain a wake word associated with the enterprise DA server 104B (e.g., an enterprise assigned wake word, a talkgroup server assigned wake word, and/or a common enterprise digital assistant wake word).

Figure 7:
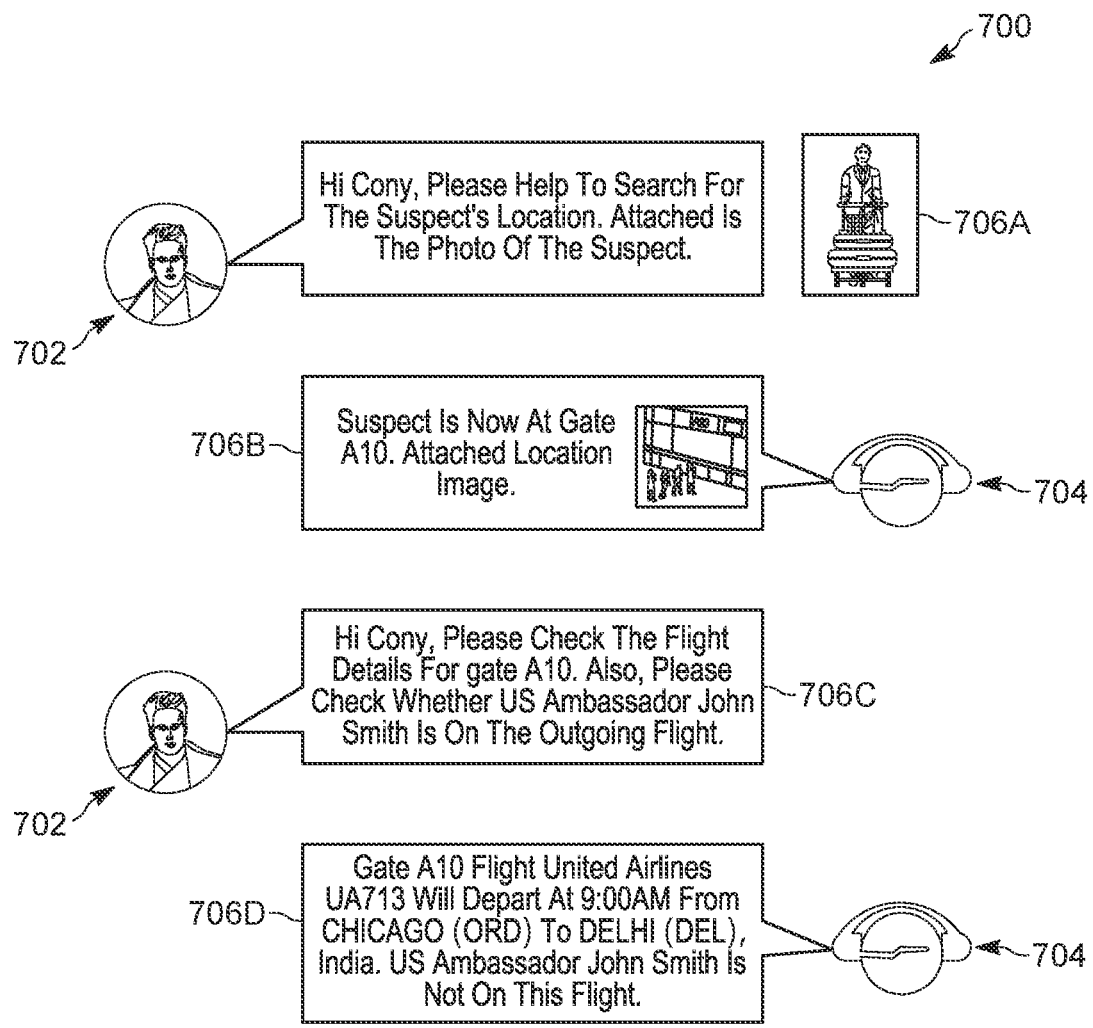
FIG. 7 illustrates an example talkgroup conversation between a user of the electronic communications device of FIG. 3 and an enterprise DA server of the system of FIG. 1 in accordance with some examples.

FIG. 7 is an example 700 of a talkgroup conversation between a user 702 of a communications device (e.g., the electronic communications device 108) and an enterprise DA 704 of an enterprise DA server (e.g., the enterprise DA server 104B). Although illustrated as a text-based conversation, it should be understood that the blocks described below may be performed via audio alone or in combination with text.

In the illustrated example, the enterprise DA 704 is part of an airport facility. As illustrated at text box 706A, the user 702 provides, to the talkgroup, a user inquiry including a wake word (in the illustrated example, "Cony") associated with the enterprise DA 704. The user inquiry, in the illustrated example, is a request for a suspect's location. The user inquiry also includes a photo of the suspect. At block 706B, the enterprise DA 704 provides the requested information (the suspect's location) in addition to a photo of the suspect at the present location.

At block 706C, the user 702 provides another user inquiry to the enterprise DA 704, including the wake word for the enterprise DA 704, requesting flight details for an airport gate that the suspect was reported to be at (by the enterprise DA 704 at block 706B). The user inquiry at block 706C also includes a request for passenger information for a particular individual ("John Smith") for the flight at the airport gate. At block 706D, the enterprise DA 704 provides the requested information to the user 702.

Figure 8:
FIG. 8 is a flowchart illustrating a method for the communications system of FIG. 1 for establishing and handling a user inquiry in accordance with some examples.

FIG. 8 illustrates an example method 800 for a communications system for establishing and handling a user inquiry directed to an enterprise DA (e.g., provided by the enterprise DA server 104B). The method 800 incorporates both the method 400 of FIG. 4 and the method 600 of FIG. 6 and further includes steps performed by the enterprise DA server 104B. Although the method 800 is described in conjunction with the system 100 as described herein, the method 800 could be used with other systems and devices. In addition, the method 800 may be modified or performed differently than the specific example provided.

As an example, the method 600 is described as being performed by the talkgroup server 200 (e.g., by the electronic processor 210) and the enterprise server 104B. However, it should be understood that, as noted above, in some instances, portions of the method 600 may be performed by other devices of the system 100.

At block 802, the enterprise DA server 104B determines an incident requiring public safety support based on information from one or more sensors (e.g., of the enterprise, to which the enterprise DA server 104B is associated). At block 804, the enterprise DA server 104B provides the sensor information related to the incident and enterprise DA server information to the dispatch console 102.

At block 806, the talkgroup server 200 receives the enterprise DA server information and the incident information and based on the enterprise DA server information, establishes a communication channel/connection with the enterprise DA server 104B. The talkgroup server 200 stores the enterprise DA server information (in the illustrated example, an identifier and an enterprise wake word) as an enterprise DA profile (block 808) and generates a talkgroup including at least the enterprise DA server 104B and an electronic communications device (e.g., the dispatch console 102 and/or one or more of the electronic communications devices 108). The talkgroup may also include a public safety DA server (e.g., the public safety DA server 104A.

The talkgroup server 200, at block 810, determines whether the enterprise DA wake word is similar to a wake word associated with the public safety DA server 104A (e.g., exceeds a similarity threshold as described above) or is otherwise ambiguous (e.g., difficult to pronounce or too similar to a particular term/command or talkgroup participant name). In instances where the enterprise DA wake word is determined to be either or both similar and/or ambiguous, the talkgroup server 200 reassigns a new wake word to the enterprise DA server 104B for use within the talkgroup (block 812). When the new enterprise DA wake word is provided in a user inquiry, the enterprise DA server 104B responds accordingly based on the particular user inquiry.

At block 814, the dispatch console 102, in conjunction with the talkgroup server 200, creates an incident talkgroup.

The incident talkgroup includes as members the enterprise DA and the public safety DA.

In instances where the enterprise DA wake word is determined not to be similar or ambiguous, block 812 is skipped. In either instance, the talkgroup server 200 provides user inquiries that include the enterprise wake word (whether original to the enterprise DA server 104B, newly assigned wake word, and/or a common enterprise DA wake word as described above) to the enterprise DA server 104B (block 816). At block 818, the talkgroup server 200 modifies or blocks information within the talkgroup conversation and will only provide user queries to the enterprise DA server 104B that include a wake word associated with/assigned to the enterprise DA server 104B. The enterprise DA server 104B, in turn at block 820, processes the user inquiry based on, for example, enterprise database information, NLP, and/or one or more privacy policies of the enterprise DA server 104B (or enterprise network thereof). At block 822, the enterprise DA server 104B provides the requested information to the talkgroup server 200. The talkgroup server 200 accordingly provides the received information to one or more of the electronic communications devices 108 of the established talkgroup.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for digital assistant communications, the system comprising:
    a talkgroup server communicatively coupled to a dispatch console and a public safety digital assistant server, the talkgroup server including an electronic processor configured to:
        receive connection information, associated with an incident, for an enterprise digital assistant server,
        establish a connection with the enterprise digital assistant server based on the connection information,
        generate a talkgroup for the incident, having talkgroup members including the public safety digital assistant server, the dispatch console, and the enterprise digital assistant server, receive, from a communications device associated with an incident responder and assigned to the talkgroup, a user inquiry including a wake word, provide the user inquiry to the enterprise digital assistant server in response to determining that the wake word is associated with the enterprise digital assistant server, and provide the user inquiry to the public safety digital assistant server in response to determining that the wake word is associated with the public safety digital assistant server.

2. The system of claim 1, wherein the wake word associated with the enterprise digital assistant server is one selected from the group consisting of an enterprise assigned wake word, a talkgroup server assigned wake word, and a common enterprise digital assistant wake word.

3. The system of claim 1, wherein the electronic processor is further configured to:

compare an enterprise assigned wake word of the enterprise digital assistant server to a public safety wake word assigned to the public safety digital assistant server, and assign a talkgroup server assigned wake word to the enterprise digital assistant server in response to determining that a level of similarity between the enterprise assigned wake word and the public safety wake word exceeds a predetermined similarity threshold.

4. The system of claim 1, wherein the electronic processor is further configured to assign a common enterprise digital assistant wake word.

5. The system of claim 1, wherein the electronic processor is further configured to:

block, from the enterprise digital assistant server, all communications within the talkgroup that do not contain at least one selected from the group consisting of an enterprise assigned wake word, a talkgroup server assigned wake word, or a common enterprise digital assistant wake word.

6. The system of claim 1, wherein the electronic processor is further configured to receive, from the enterprise digital assistant server, requested information in response to the user inquiry, and provide the requested information through an audio or a video output of the communications device associated with the incident responder.

7. The system of claim 1, wherein the electronic processor is further configured to modify information within the user inquiry provided to the enterprise digital assistant server based on a public safety data privacy policy.

8. The system of claim 1, wherein the electronic processor is further configured to receive information, through the dispatch console, regarding the incident from the enterprise digital assistant server in addition to the connection information.

9. The system of claim 1, wherein the connection information includes at least one selected from a group consisting of a unique identifier of the enterprise digital assistant server, a wake word, address information, and password information.

10. The system of claim 1, wherein the dispatch console receives a connection request including the connection information from the enterprise digital assistant server.

11. The system of claim 1, wherein the dispatch console receives the connection information from the enterprise digital assistant server in response to the dispatch console transmitting a request to the enterprise digital assistant server.

12. A method for operating a communications system including digital assistant communications, the method comprising:

receiving connection information, associated with an incident, for an enterprise digital assistant server, establishing a connection with the enterprise digital assistant server based on the connection information, generating a talkgroup for the incident, the talkgroup including a public safety digital assistant server, a dispatch console, and the enterprise digital assistant server, receiving, from a communications device associated with an incident responder and assigned to the talkgroup, a user inquiry including a wake word, providing the user inquiry to the enterprise digital assistant server in response to determining that the wake word is associated with the enterprise digital assistant server, and providing the user inquiry to the public safety digital assistant server in response to determining that the wake word is associated with the public safety digital assistant server.

13. The method of claim 12, wherein the wake word associated with the enterprise digital assistant server is one selected from the group consisting of an enterprise assigned wake word, a talkgroup server assigned wake word, and a common enterprise digital assistant wake word.

14. The method of claim 12, the method further comprising:

comparing an enterprise assigned wake word of the enterprise digital assistant server to a public safety wake word assigned to the public safety digital assistant server, and assigning a talkgroup server assigned wake word to the enterprise digital assistant server in response to determining that a level of similarity between the enterprise assigned wake word and the public safety wake word exceeds a predetermined similarity threshold.

15. The method of claim 12, the method further comprising assigning a common enterprise digital assistant wake word.

16. The method of claim 12, the method further comprising:

blocking, from the enterprise digital assistant server, all communications within the talkgroup that do not contain at least one selected from the group consisting of an enterprise assigned wake word, a talkgroup server assigned wake word, and a common enterprise digital assistant wake word.

17. The method of claim 12, the method further comprising:

receiving, from the enterprise digital assistant server, requested information in response to the user inquiry, and providing the requested information through an audio or a video output of the communications device associated with the incident responder.

18. The method of claim 12, the method further comprising modifying information within the user inquiry provided to the enterprise digital assistant server based on a public safety data privacy policy.

* * * * *